United States Patent [19]
Kilburn

[11] Patent Number: 5,702,172
[45] Date of Patent: Dec. 30, 1997

[54] LIGHT EMITTING BICYCLE PEDAL

[76] Inventor: Robert Kilburn, 711 S. Montezuma, Apt. #3, Prescott, Ariz. 86303

[21] Appl. No.: 200,187

[22] Filed: Feb. 22, 1994

[51] Int. Cl.$^6$ ................................................ B62J 6/00
[52] U.S. Cl. ........................ 362/72; 362/800; 340/432
[58] Field of Search .................. 74/594.6; 340/432; 362/72, 800; D12/125

[56] References Cited

U.S. PATENT DOCUMENTS

| | | | |
|---|---|---|---|
| 2,185,600 | 1/1940 | McComb | 240/7.55 |
| 2,334,442 | 11/1943 | Salimbene | 240/7.55 |
| 2,493,491 | 1/1950 | MacMahon | 240/10.6 |
| 2,732,540 | 1/1956 | MacMahon | 340/87 |
| 2,732,541 | 1/1956 | MacMahon | 340/134 |
| 2,767,391 | 10/1956 | MacMahon | 340/81 |
| 3,764,976 | 10/1973 | MacMahon | 340/87 |
| 4,860,177 | 8/1989 | Simms | 362/72 |

FOREIGN PATENT DOCUMENTS 2202098  9/1988  United Kingdom ..................... 362/72

*Primary Examiner*—Stephen F. Husar

[57] ABSTRACT

An improved light emitting bicycle pedal initiating with a pedal body (10) rotatably journaled on a pedal carrying shaft (12) which is adapted at one end for attachment to a bicycle. Such pedal body (10) contains a light emitting source including a light emitting diode circuit (22) protected by a transparent cover (36), and an electric power source (24) protected and concealed by a cover plate (38), and an electric switching means (26) protected by a flexible cover (28). The above light emitting source members are electrically oriented relative to one another structuring an electric circuit. With the opening and closing of the electric circuit manually activated by hand, activated by an internal motion switch, or activated automatically by the inserting and removing of a cycling shoe cleat (20), including partial lateral movement of the cycling shoe cleat (20) while engaged in the bicycle pedal.

6 Claims, 8 Drawing Sheets

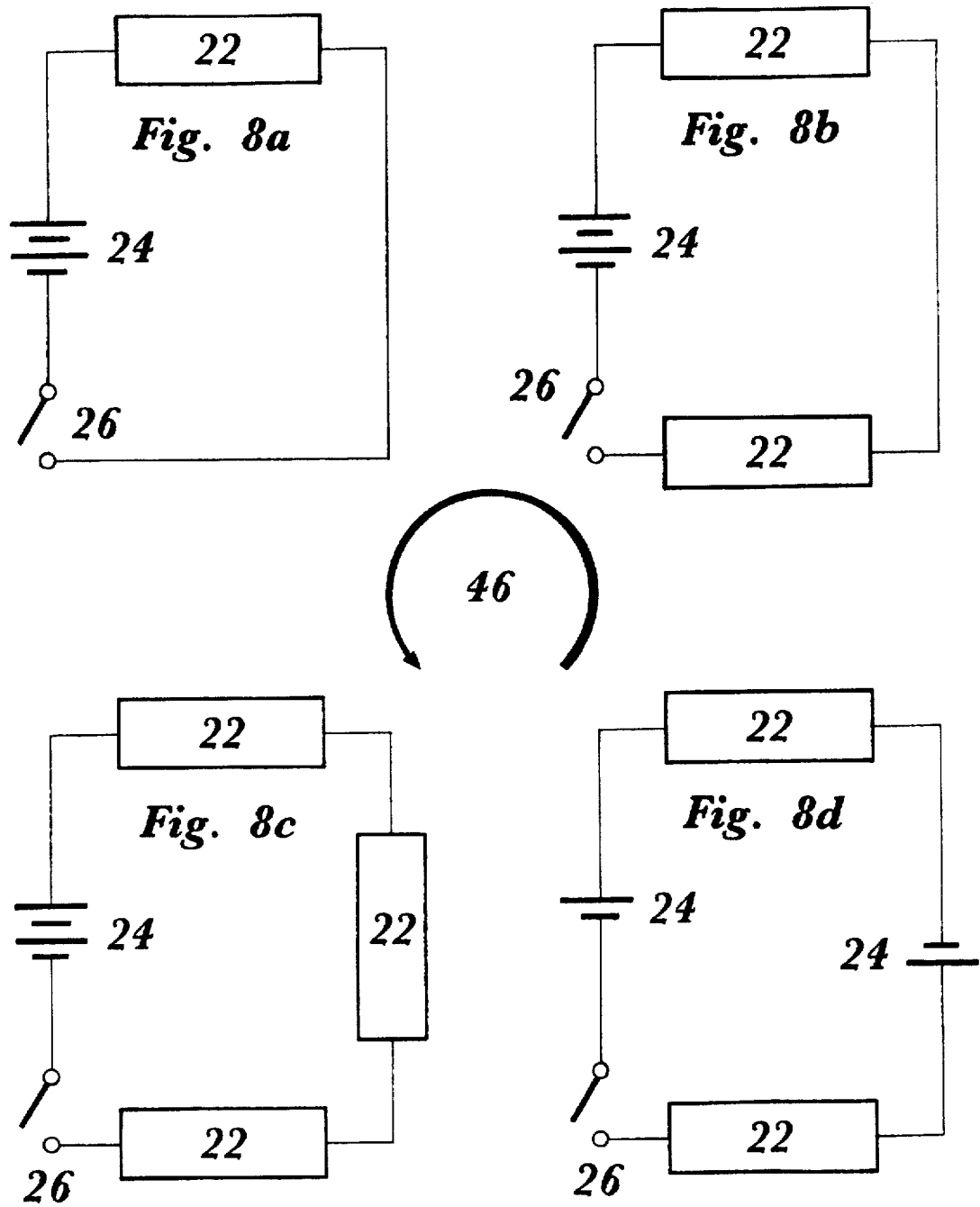

LIGHT EMITTING BICYCLE PEDAL

BACKGROUND—FIELD OF INVENTION

This Invention relates to bicycle pedals, more specifically to an improved light emitting bicycle pedal.

BACKGROUND—DISCUSSION OF PRIOR ART

Originally, bicycle pedals were equipped with reflectors of various types to enhance safety while cycling at night. Such reflectors were effective dependent on outside light sources for illumination, such as automobile headlights. Without an outside light source reflectors are rendered inoperative.

Later, bicycle pedals were equipped to emit flashing lights. These pedals contained various mechanical components to create such flashing, as shown in the prior art references cited with this application. These references show bicycle pedals that incorporate mechanical parts to produce the flashing lights. Mechanical parts such as cams, levers, gears, gravity switches, bearing switches, generators, springs, etc. Such mechanical parts are prone to premature wear and failure, especially in a bicycle pedal.

The prior art pedals have other disadvantages, for example;

(a) The flashing of the lights depends on the movement of the cyclists foot, or the rotation of the pedals while cycling. In the latter case, if the cyclist is not pedaling, as in coasting downhill or waiting at a traffic signal, the lights would not be flashing and possibly no illumination whatsoever. This is due to the reliance on mechanical components to create the flashing lights.

(b) Bicycle pedals sustain a substantial amount of abuse, from pedaling to crashing. Due to the nature of cycling, the cyclists pedaling cadence is continually changing, sometimes very abruptly. The mechanical components in the prior art would have a difficult time adapting to such abrupt changes in cadence. Especially if the cyclist intentionally or inadvertently reversed the pedaling rotation during a high cadence, as by trying to avoid an obstacle or regain control of the bicycle.

(c) Some of the prior art pedals included placement of the light emitting source on the outside of the pedal, while extending below and above the pedal surface itself. This outside placement would decrease the maximum angle of clearance between the pedal and road surface, creating a hazard for turning.

The above mentioned disadvantages are only a few of the reasons these bicycle pedals were never successfully implemented.

The following are prior art patents referred to in this application.

| Name | Number | Patented |
| --- | --- | --- |
| James G. McComb | 2,185,600 | Jan. 2, 1940 |
| Louis Steven Salimbene | 2,334,442 | Nov. 16, 1943 |
| Paul H. MacMahon | 2,493,491 | Jan. 3, 1950 |
| Paul H. MacMahon | 2,732,540 | Jan. 24, 1956 |
| Paul H. MacMahon | 2,732,541 | Jan. 24, 1956 |
| Paul H. MacMahon | 2,767,391 | Oct. 16, 1956 |
| Paul H. MacMahon | 3,764,976 | Oct. 9, 1973 |

OBJECTS AND ADVANTAGES

The "Light Emitting Bicycle Pedal" solves the problems encountered by the prior art by utilizing L.E.D. technology to produce the flashing lights. L.E.D. (light emitting diode) technology utilizes electrical components to produce the flashing lights. L.E.D. technology enables the use of flashing lights on a bicycle pedal without incorporating any failure prone mechanical parts for such flashing. Also, the low voltage required by the L.E.D. allows for a much smaller lighting system which is essential in today's lighter and faster bicycle market.

Accordingly, several objects and advantages of the "Light Emitting Bicycle Pedal" are;

(a) The invention creates rapidly flashing lights on a bicycle pedal without utilizing extensive mechanics for such flashing.

(b) Prior art pedals dictate mechanical parts to produce the flashing lights, wherein the invention dictates electrical components to produce such flashing lights, eliminating the potential of mechanical failure.

(c) Prior art pedals were never successfully implemented due to the extensive mechanics involved. Mechanisms such as cams, levers, gears, gravity switches, bearing switches, generators, springs, etc. Also, prior art pedals were too awkward to properly and safely work. As pointed out in the Discussion of Prior Art section above.

(d) The invention solves a long felt need for flashing lights on a bicycle pedal by incorporating electrical components, while eliminating mechanical parts to produce the flashing lights.

(e) The invention provides rapidly flashing lights with the pedals rotating or not. Wherein the flashing lights of the prior art were dependent on the rotating of the pedals, or the movement of the cycling shoe.

(f) The invention provides rapidly flashing lights which rotate circularly and oscillate vertically while in use, depending on the angle viewed from.

(g) The light emitting diodes are highly luminescent, and can be viewed from a much further distance than conventional bulbs which are utilized by the prior art.

(h) The replacement of mechanical parts by electrical components creates a highly visible, and reliable lighted bicycle pedal capable of succeeding in today's lighter and faster bicycle market.

(i) This invention falls into a crowded art where small advances are crucial.

Further objects and advantages of the "Light Emitting Bicycle Pedal" will become apparent from a consideration of the drawings and ensuing description.

DESCRIPTION OF FIGURES

The following description of figures discloses the basic components necessary to achieve the invention. It should be understood that due to the variety of bicycle pedals available, the components and their relationships relative to one another will readily change according to the structure of the bicycle pedal utilized. Realistically, all such modifications would be impossible to show in this application, but all such modifications should be encompassed so as not to depart from the scope and spirit of the invention. Component changes such as electric power source, electric switching means, and light emitting diode circuit system, type, size composition, and placement of each, within or on the bicycle pedal.

FIG. 7B discloses an outside view of the invention utilizing a clipless variety of bicycle pedal, in which the light emitting source is activated by inserting a cycling shoe cleat, which is disclosed in FIG. 7a.

FIGS. 8A thru 8D disclose several variations in electrical circuits which are utilizeable in the invention.

REFERENCE NUMERALS IN FIGURES

10. Pedal body, (includes the basic components neccessary for all bicycle pedals).
12. Pedal carrying shaft.
14. Pedal tread.
16. Tension loaded cleat retaining and releasing pawl.
18. Cleat retaining pawl.
20. Cycling shoe cleat.
22. Light emitting diode circuit.
24. Electric power source.
26. Electric switching means.
28. Flexible cover.
30. Light emitting diodes.
32. Controllable electron valve.
34. Circuit board.
36. Transparent cover.
38. Cover plate.
40. Alternative placements of light emitting diode circuit.
42. Alternative placements of switching means.
44. Screws or bolts.
46. Electric current flow direction.
48. Upper surface portion.
50. Rear surface portion.

DESCRIPTION OF INVENTION

Figure 1A:
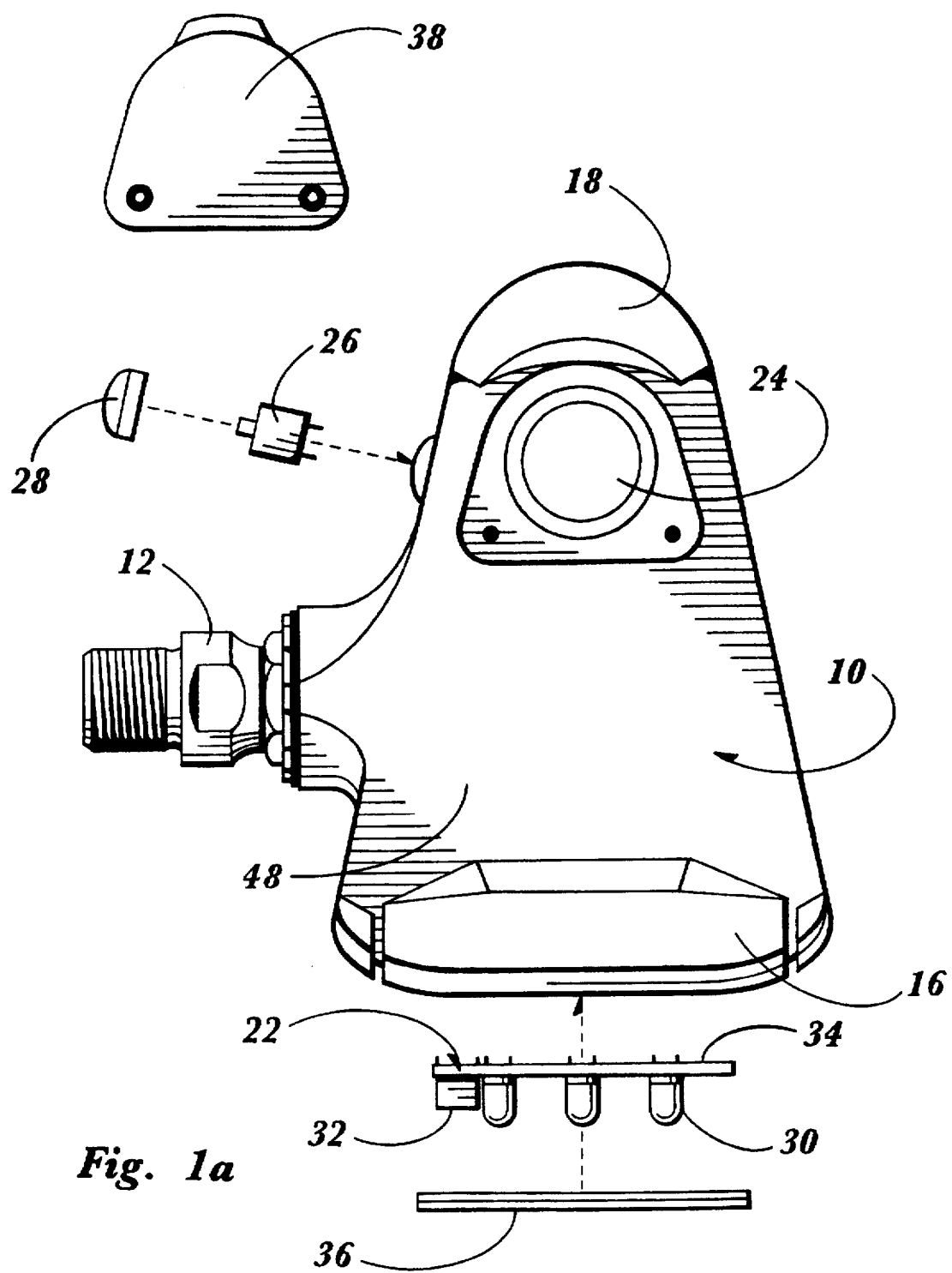
FIG. 1A discloses a top view of the invention utilizing a clipless variety of bicycle pedal.
Figure 2A:
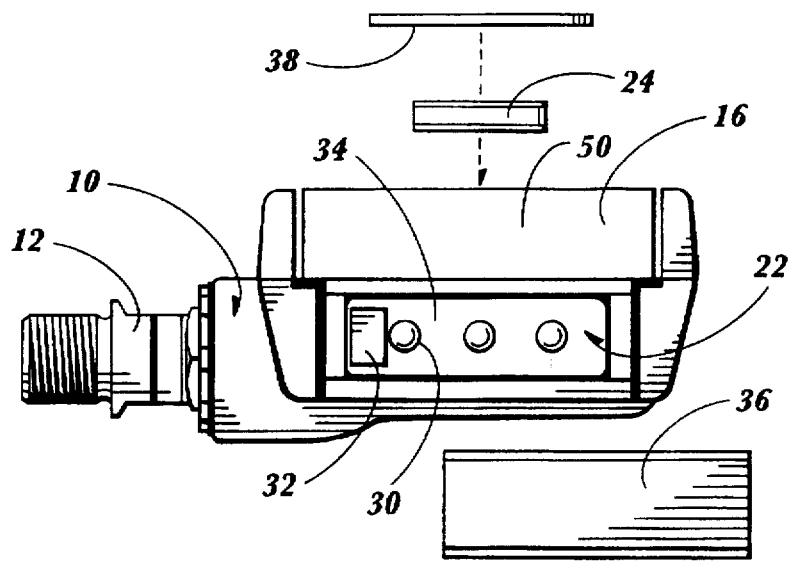
FIG. 2A discloses a rear view and FIG. 2B discloses an outside view of the invention utilizing a clipless variety of bicycle pedal.
Figure 2B:
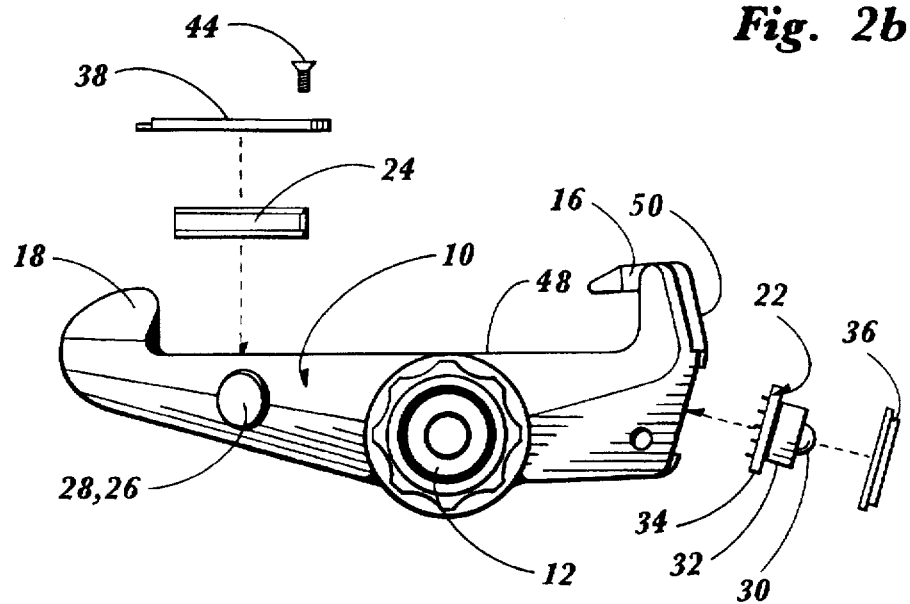
Figure 5A:
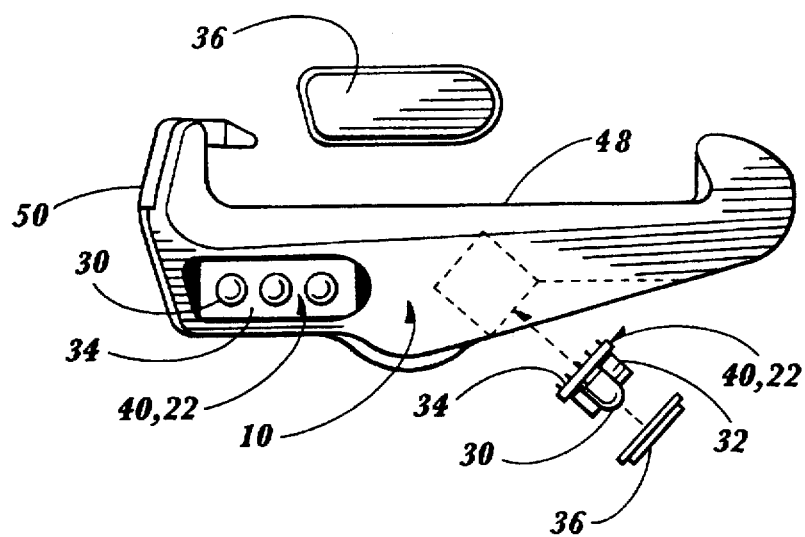
FIGS. 5A and 5B disclose outside views of alternative variations in placement of the light emitting diode circuit on the bicycle pedal.

Referring to FIGS. 1A, 2A, and 2B to describe the invention. FIGS. 1a, 2a and 2b show a clipless variety of bicycle pedal including, a pedal body 10 rotateably journaled on a pedal carrying shaft 12 which is adapted at one end for attachment to a bicycle. Pedal body 10 contains a tension loaded cleat retaining and releasing pawl 16 and a cleat retaining pawl 18 which is typical of clipless bicycle pedals. Pedal body 10 is adapted to contain a light emitting source which includes, a light emitting diode circuit 22 and an electric power source 24 and an electric switching means 26. L.E.D. circuit 22 and power source 24 and switching means 26 are electrically connected to one another, (as disclosed in FIGS. 8a thru 8d in the various methods), structuring the light emitting source within pedal body 10. L.E.D. circuit 22 includes a plurality of light emitting diodes 30 and a controllable electron valve 32 arranged on a circuit board 34. L.E.D. circuit 22 is protected by a transparent cover 36. L.E.D. circuit 22 is positioned in the rear surface portion 50 of pawl 16, or can be positioned in various other locations of pedal body 10, (two of which are shown in FIG. 5a). Also, several L.E.D. circuits 22 can be positioned in pedal body 10 simultaneously, creating an even greater range of visibility. Power source 24 can consist of a variety of batteries from alkaline to lithium to perform the specific function disclosed. Power source 24 is located in the upper surface plane 48 of pedal body 10, and is protected and concealed by a cover plate 38 which is secured by a plurality of screws 44 or an equivalent securing means, such as a snap-on cover or a thread-on cover. Switching means 26 is protected by a flexible cover 28 and located in pedal body 10 in an abuse free area which is easily and safely accessible, therefore abuse free from normal cycling hazards and easily and safely accessible while cycling or stationary. Switching means 26 can also include an internal motion switch. The entire light emitting source must be water-proofed as far as is necessary for proper functioning of all the electrical components.

Figure 3A:
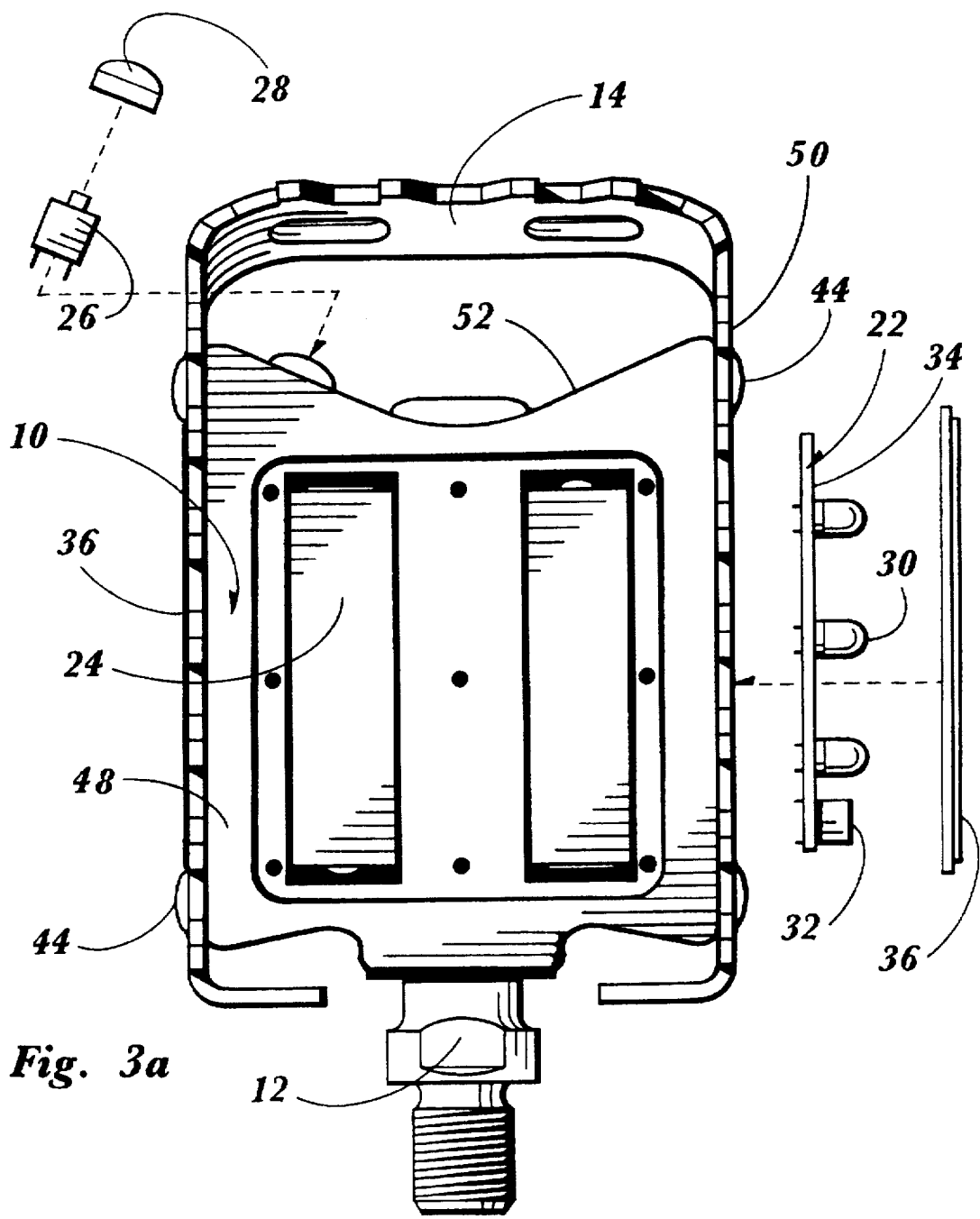
FIG. 3A discloses a top view of the invention utilizing a rat-trap variety of bicycle pedal.
Figure 4A:
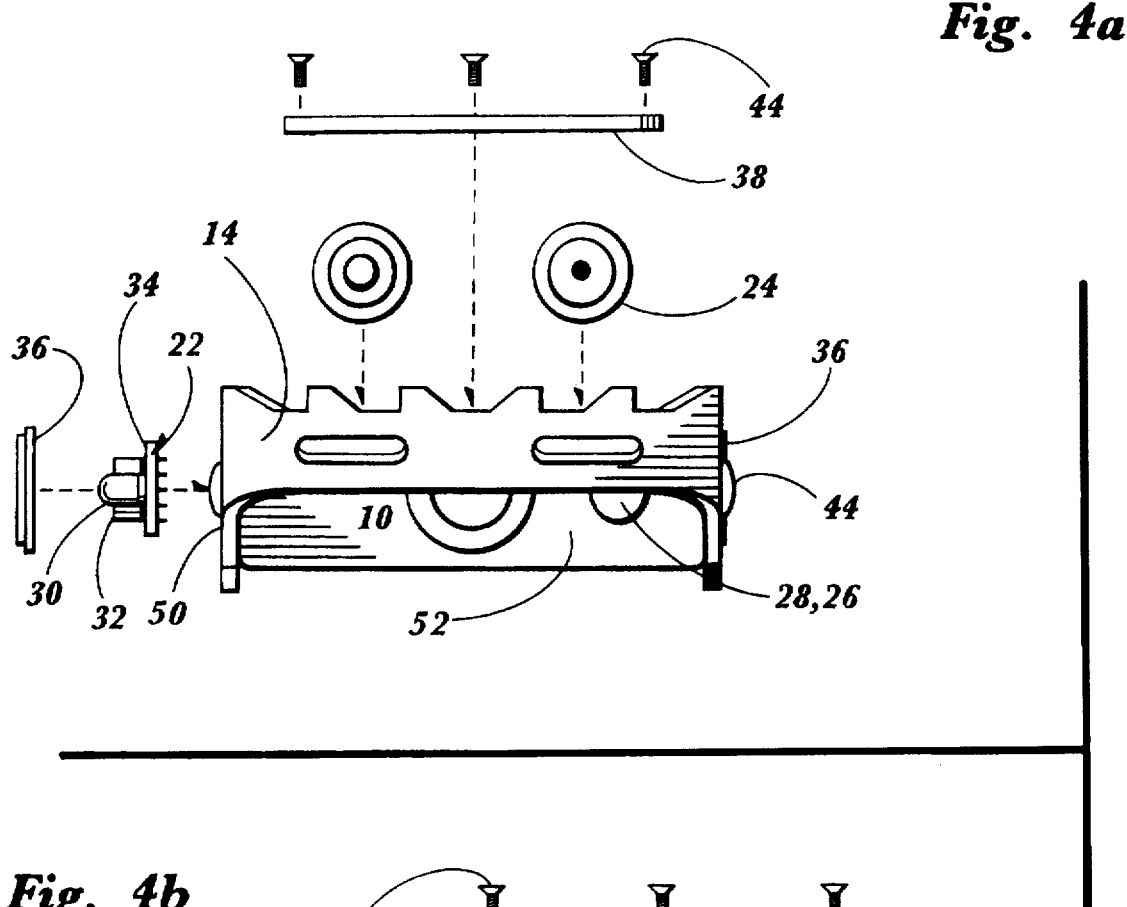
FIG. 4A discloses an outside view and FIG. 4B discloses a rear view of the invention utilizing a rat-trap variety of bicycle pedal.
Figure 4B:
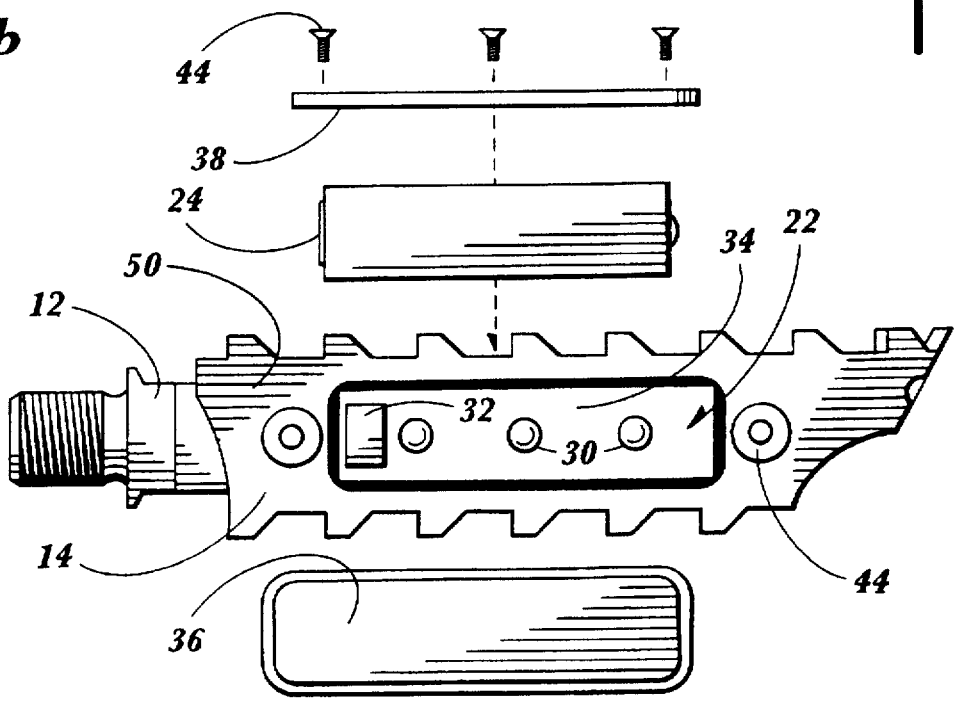
Figure 5B:
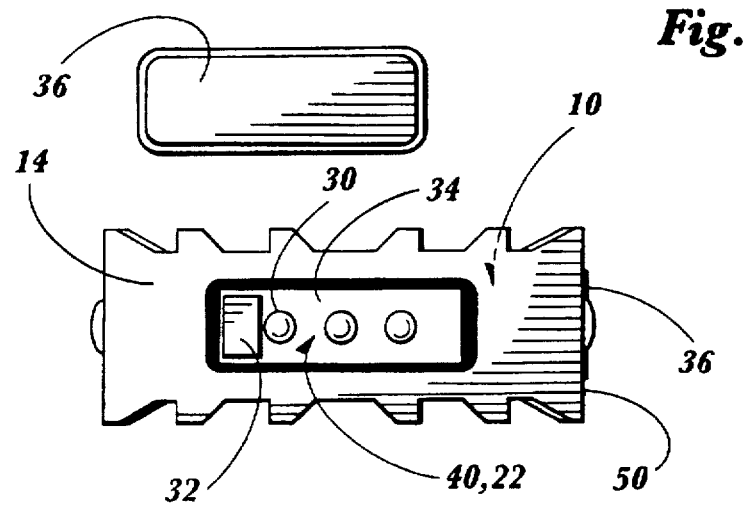

FIGS. 3A, 4A, and 4B to describe the invention. FIGS. 3a, 4a and 4b show a rat-trap variety of bicycle pedal including, a pedal body 10 rotateably journaled on a pedal carrying shaft 12 which is adapted at one end for attachment to a bicycle. Pedal body 10 supports a pedal tread 14 which is mounted onto pedal body 10 utilizing a plurality of screws or bolts 44. Pedal tread 14 can also be integrally molded onto pedal body 10, thus creating one homogeneous unit of both pedal body 10 and pedal tread 14, (as disclosed in FIGS. 6a and 6b). Pedal body 10 is adapted to contain a light emitting source which includes, a light emitting diode circuit 22 and an electric power source 24 and an electric switching means 26. L.E.D. circuit 22 and power source 24 and switching means 26 are electrically connected to one another, (as disclosed in FIGS. 8a thru 8d in the various methods), structuring the light emitting source within pedal body 10. L.E.D. circuit 22 includes a plurality of light emitting diodes 30 and a controllable electron valve 32 arranged on a circuit board 34. L.E.D. circuit 22 is protected by a transparent cover 36. L.E.D. circuit 22 is positioned in the rear surface portion 50 of pedal body 10 behind pedal tread 14, or can be positioned in various other locations of pedal body 10, (two of which are shown in FIG. 5b). Also, several L.E.D. circuits 22 can be positioned in pedal body 10 simultaneously, creating an even greater range of visibility. Power source 24 can consist of a variety of batteries from alkaline to lithium to perform the specific function disclosed. Power source 24 is located in the upper surface plane 48 of pedal body 10, and is protected and concealed by a cover plate 38 which is secured by a plurality of screws 44 or an equivalent securing means, such as a snap-on cover or a thread-on cover. Switching means 26 is protected by a flexible cover 28 and located in the outer surface portion 52 of pedal body 10 in an abuse free area which is easily and safely accessible while cycling or stationary. Switching means 26 can also include an internal motion switch. The entire light emitting source must be water-proofed as far as is necessary for proper functioning of all the electrical components.

Referring to FIGS. 5A and 5B to describe the invention. FIGS. 5a and 5b show alternative placements of light emitting diode circuit 40" within or on pedal body 10 of both the clipless and rat-trap variety of bicycle pedal. FIG. 5a shows a light emitting diode circuit 22 positioned on either the outside of pedal body 10 and/or, recessed in the lower front of pedal body 10 on the clipless variety of bicycle pedal. FIG. 5b shows L.E.D. circuit 22 positioned on the outer surface portion 52 of pedal body 10 and/or, positioned on the forward of pedal body 10 behind pedal tread 14 on the rat-trap variety of bicycle pedal. FIGS. 5A and 5B disclose only a few of the possible positionings of L.E.D. circuit 22 on pedal body 10. Other possibilities include several L.E.D. circuits 22 positioned on different sides of pedal body 10 simultaneously, thus creating an even greater range of visibility. L.E.D. circuit 22 can also wrap along the corners of pedal body 10 which are most visible during the pedaling stroke, thus creating an increased angle of visibility. L.E.D. circuit 22 is not limited to a plurality of light emitting diodes 30 or a controllable electron valve 32 arranged on a circuit board 34. But it can consist of a single L.E.D. 30 positioned in pedal body 10, and electrically connected to a parent L.E.D. circuit 22 which contains the electron valve 32. Resulting in a single L.E.D. 30 utilized when several L.E.D. circuits 22 are distributed on pedal body 10. Also, the L.E.D.s 30 contained on L.E.D. circuit 22 can be angled differently relative to one another. This would enhance rearward and/or forward visibility since a cyclists foot continually changes angles during the pedaling rotation.

Figure 6A:
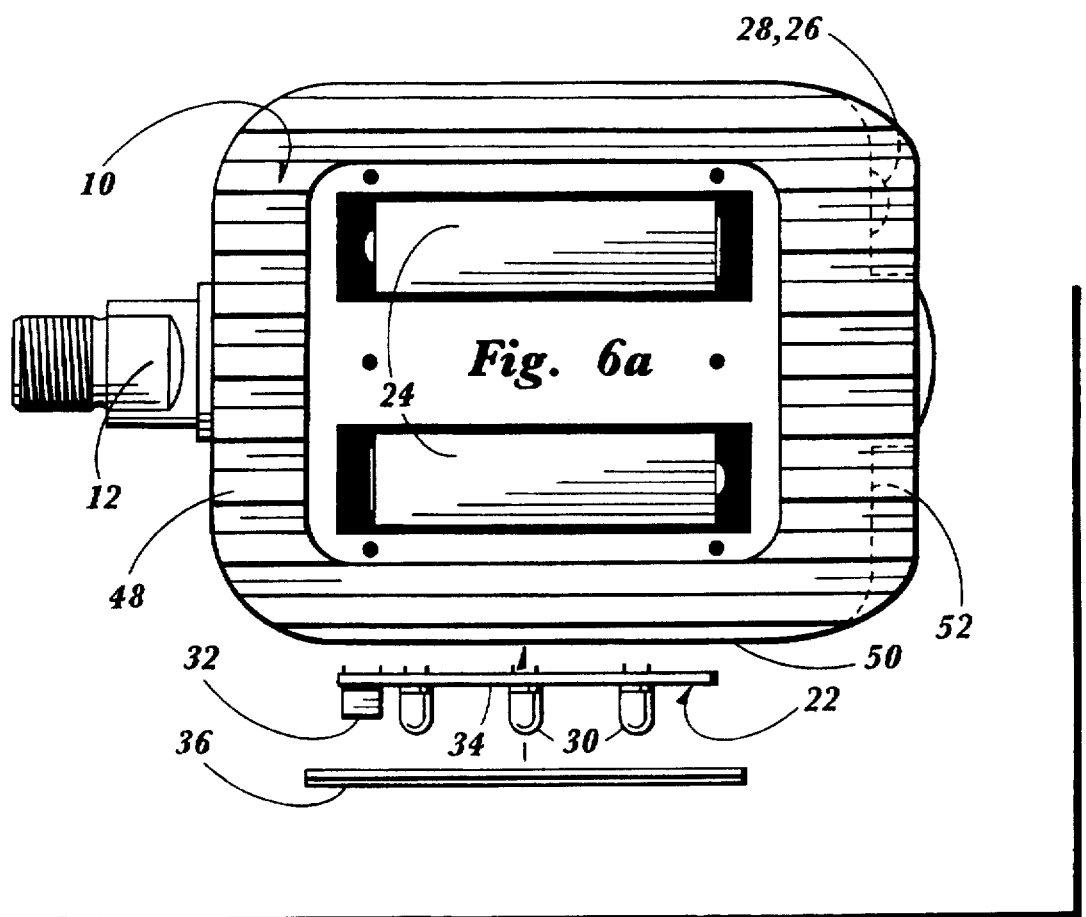
FIG. 6A discloses a top view and FIG. 6B discloses an outside view of the invention which is designed for children's bicycles.
Figure 6B:
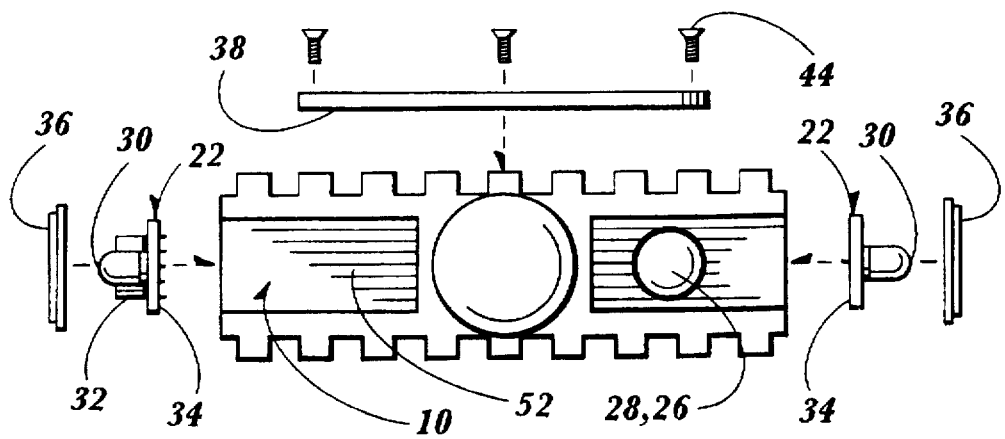

Referring to FIGS. 6A and 6B to describe the invention. FIGS. 6a and 6b show the invention which is designed for use on children's bicycles. Pedal body 10 and pedal tread 14 are formed as one homogeneous unit, utilizing a malleable and durable material, and rotateably journaled on a pedal carrying shaft 12 which is adapted at one end for attachment to a bicycle. Pedal body 10 is adapted to contain a light emitting source which includes, a light emitting diode circuit 22 and an electric power source 24 and an electric switching means 26. L.E.D. circuit 22 and power source 24 and switching means 26 are electrically connected to one another, (as disclosed in FIGS. 8a thru 8d in the various methods), structuring the light emitting source within pedal body 10. L.E.D. circuit 22 includes a plurality of light emitting diodes 30 and a controllable electron valve 32 arranged on a circuit board 34. L.E.D. circuit 22 is protected by a transparent cover 36. L.E.D. circuits 22 are positioned in pedal body 10 as is disclosed, (or can conform to the description as set forth for FIGS. 5A and 5B). Power source 24 can consist of a variety of batteries from alkaline to lithium to perform the specific function disclosed. Power source 24 is located in the upper surface portion 48 of pedal body 10, and is protected and concealed by a cover plate 38 which is secured by a plurality of screws 44 or an equivalent securing means, such as a snap-on cover or a thread-on cover. Switching means 26 is located on the outer surface portion 52 of, and is recessed within pedal body 10, while being protected by a flexible cover 28. Switching means 26 is located on the outer surface portion 52 of pedal body 10, so as to keep children's fingers away from the drive sprocket if activation of the system becomes necessary during cycling. This positioning of switching means 26 on the outer surface portion 52 of pedal body 10, demands reaching from the outside, rather than from the inside of the foot to activate the system, thus keeping small fingers away from a big sprocket. Switching means 26 is recessed within pedal body 10 as a protection recourse for switching means 26, since children have a tendency to crash and/or abruptly abandon their bicycles during play. Switching means 26 can also include an internal motion switch. Also, the entire light emitting source must be water-proofed as far as is necessary for proper functioning of all the electrical components.

Figures 7A, 7B:
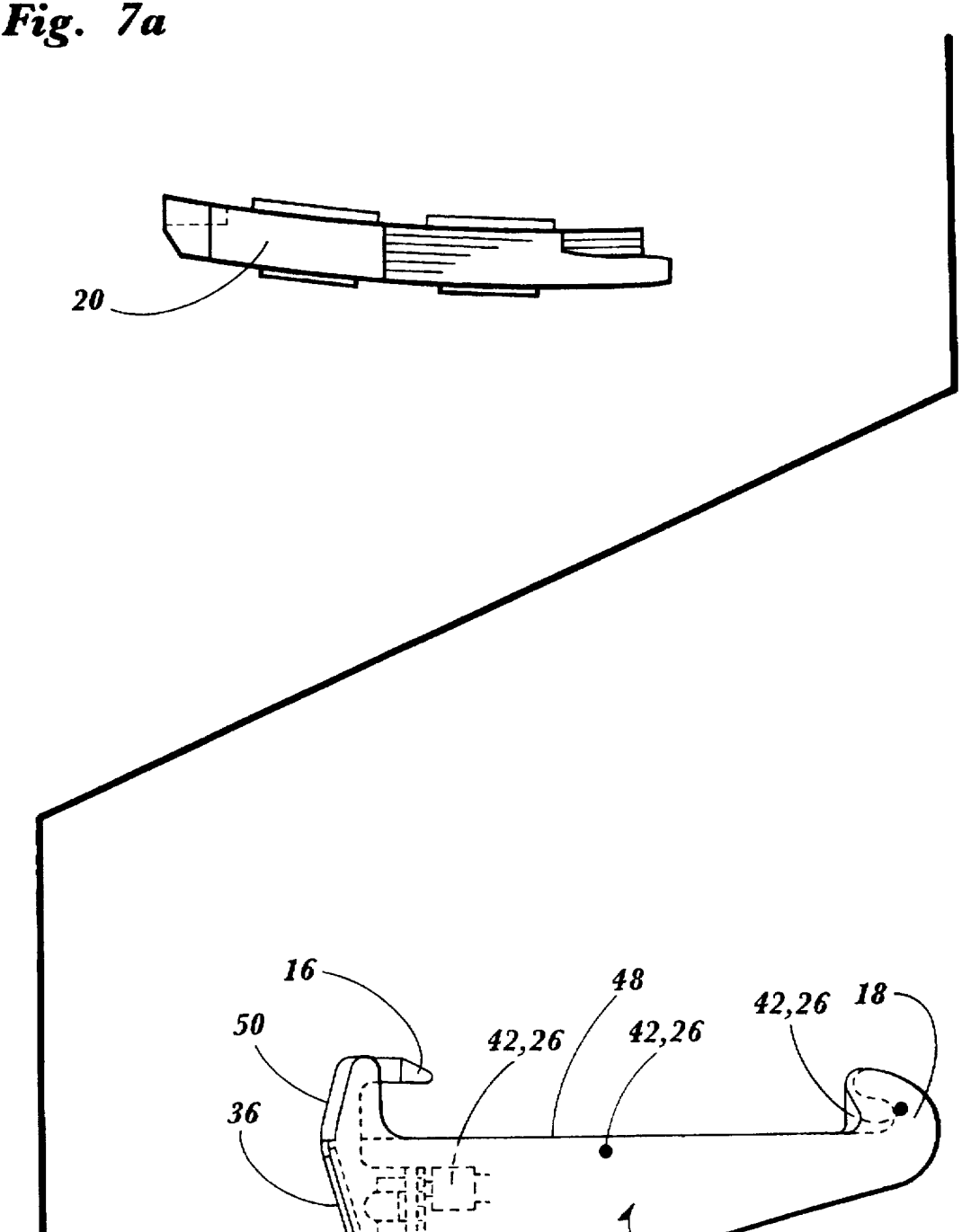

Referring to FIGS. 7A and 7B to describe the invention. FIG. 7a shows a cycling shoe cleat 20 which is used in conjunction with the clipless variety of bicycle pedal. Cleat 20 is the securing means between cycling shoe and bicycle pedal. When cleat 20 is inserted into a clipless bicycle pedal, cleat 20 rests on the upper surface portion 48 of pedal body 10 and is clamped between a cleat retaining pawl 18 and a tension loaded cleat retaining and releasing pawl 16. FIG. 7b shows a clipless variety of bicycle pedal, in which an electric switching means 26 is contained within pedal body 10 and is activated by the inserting of cleat 20. This is accomplished by positioning switching means 26 in pedal body 10 in an area that is contacted by cleat 20 while cycling. Such as on the surface of pedal body 10, or extending from the inside of pawl 18. Also, switching means 26 can be activated by pawl 16 which is physically thrust outward when cleat 20 is inserted into the bicycle pedal. This is accomplished by positioning switching means 26 in pedal body 10 so as to make contact with pawl 16. In this way, pawl 16 mechanically becomes part of switching means 26. (reference numeral 42 discloses alternative placements of switching means 26) The latter automatic switching means 26 application is a more desirable system, since lateral movement of cleat 20 in the bicycle pedal will have no effect on switching means 26 whatsoever, with shutdown of the light emitting source guaranteed when cleat 20 is completely removed. Or, if cycling illumination becomes necessary or unnecessary for some reason while cycling, cleat 20 can be partially twisted in the normal exiting manner, thus rearwardly thrusting pawl 16 enough to actuate switching means 26, but not enough to cause cleat 20 to completely disengage from the bicycle pedal. Switching means 26 can also include an internal motion switch. (Any further information needed for FIGS. 7A and 7B can be obtained from the descriptions for FIGS. 1A, 2A, 2B, 5A, 5B, 7A, 7B, and 8A thru 8D).

Referring to FIGS. 8A thru 8D to describe the invention. FIGS. 8a thru 8d show various electrical schematics which can be utilized in the invention. These schematics disclose the basic components of the light emitting source. (Light emitting diode circuit 22 is shown in block diagram form because of the possible variations, as disclosed in the description for FIGS. 5A and 5B). FIG. 8a shows a light emitting source that includes, a rearward positioned light emitting diode circuit 22 relative to a bicycle pedal, powered by an electric power source 24 and controlled by an electric switching means 26. FIG. 8b shows a light emitting source that includes, a rearward and forward positioned light emitting diode circuit 22 relative to a bicycle pedal, powered by an electric power source 24 and controlled by an electric switching means 26. FIG. 8c shows a light emitting source that includes, a rearward, forward and outside positioned light emitting diode circuit 22 relative to a bicycle pedal, powered by an electric power source 24 and controlled by an electric switching means 26. FIG. 8d shows a light emitting source that includes, a rearward and forward positioned light emitting diode circuit 22 relative to a bicycle pedal, powered by a set of electric power sources 24 and controlled by an electric switching means 26. Reference numeral 46 shows the direction of electric current flow. Also, the bicycle pedal itself can constitute part of the electric circuit. Power source 24 can consist of a single battery, or several batteries connected in series to achieve the voltage needed to operate a controllable electron valve 32 and a plurality of light emitting diodes 30, this is usually but not limited to 3 volts. The above descriptions for FIGS. 8A thru 8D disclose only a few of the possible electric circuits that can be employed in the invention, any of the electric circuits disclosed including combinations and variations thereof should be encompassed by the invention. (Reference should be directed to the descriptions for FIGS. 5A and 5B for further applications of the components in the light emitting source).

Operation of Invention

Referring to FIGS. 1A, 2A, 2B, 5A, 7A, 7B, and 8A thru 8D on the operation of the invention, which is incorporated into a clipless variety of bicycle pedal. A clipless variety of bicycle pedal includes, a pedal body 10 and a tension loaded cleat retaining and releasing pawl 16 and a cleat retaining pawl 18. Pedal body 10 is rotateably journaled on a pedal carrying shaft 12 which is adapted at one end for attachment to a bicycle. Pawl 16 is spring loaded so as to create a clamping means between pawl 16 and pawl 18 to secure a cycling shoe cleat 20. Cleat 20 is secured to the bottom of a cycling shoe. The nose of cleat 20 is inserted into pawl 18, cleat 20 is then pushed downward contacting and thrusting pawl 16 rearwardly. When cleat 20 is fully seated on pedal body 10, pawl 16 which is spring loaded snaps into a clamping position on cleat 20. Removal of cleat 20 is accomplished by either twisting the cycling shoe with a heel-outward motion, a heel-upward motion, or a heel-diagonally-upward motion.

Pedal body 10 is adapted to contain a light emitting source which includes, a light emitting diode circuit 22 and an electric power source 24 and an electric switching means 26. L.E.D. circuit 22 and power source 24 and switching means 26 are electrically connected to one another, (as disclosed in FIGS. 8a thru 8d in the various methods), structuring the light emitting source within pedal body 10. L.E.D. circuit 22 is the light emitting member of the light emitting source and includes, a plurality of light emitting diodes 30 and a controllable electron valve 32 arranged on a circuit board 34. L.E.D. circuit 22 is positioned in the rear surface portion 50 of pawl 16, or can be positioned in various other locations of pedal body 10, (refer to the description of FIGS. 5A and 5B for further variations in placement and composition of L.E.D. circuit 22). L.E.D. circuit 22 is protected by a transparent cover 36 which can be clear, amber, or red in color, depending on which side of the bicycle pedal is illuminated, and what color L.E.D.s 30 are being utilized.

Circuit board 34 can be of any size depending on where it will be positioned in pedal body 10, with the most likely positioning in the rear surface portion 50 of pedal body 10, and can contain as few as one L.E.D. 30 and no electron valve 32 when several L.E.D. circuits 22 are distributed on pedal body 10. If one L.E.D. 30 is utilized, it must be electrically connected to a parent L.E.D. circuit 22 which contains the electron valve 32. This is because electron valve 32 controls the flashing activity of the L.E.D.s 30.

Electron valve 32 is an integrated circuit of the type designed to meter the flashing rate of L.E.D.s 30. These integrated circuits are basically linear oscillating circuits, and proper application of these circuits can be obtained in the data sheets available through the manufacturer. As will be found depending on what type of integrated circuit is being utilized, some may need the external assistance of limiting resistors and/or timing capacitors, and others need no external assistance at all. Also, depending on the design of the light emitting source, including the type of L.E.D.s 30 being utilized, electron valve 32 may be an optional element.

Power source 24 can consist of a variety of batteries from alkaline to silver and lithium, and can be of the rechargeable type. Power source 24 can consist of a single battery, or several batteries connected in series to achieve the voltage needed to operate the electron valve 32 and L.E.D.s 30, this is usually but not limited to 3 volts. Power source 24 is located in the upper surface portion 48 of pedal body 10, and is protected and concealed by a cover plate 38 which is secured by a plurality of screws 44, or an equivalent securing means such as a snap-on cover or a thread-on cover.

Switching means 26 controls the activity between L.E.D. circuit 22 and power source 24. Switching means 26 is protected by a flexible cover 28 and located in pedal body 10 in an abuse free area, which is easily and safely accessible while cycling or stationary. Switching means 26 can be positioned, but not limited to, the inside of pedal body 10 protected from outside hazards such as street curbs, vegetation, and numerous other obstacles encountered while cycling.

Switching means 26 can also be an automatic function in which cleat 20 activates the system. This is accomplished by positioning switching means 26 in pedal body 10 in an area that is contacted by cleat 20 while cycling. Such as on the upper surface portion 48 of pedal body 10, or extending from the inside of pawl 18. Also, switching means 26 can be activated by pawl 16. This is accomplished by positioning switching means 26 in pedal body 10 so as to make contact with pawl 16. When cleat 20 is inserted into the bicycle pedal, pawl 16 is thrust rearwardly, this rearward movement would cause pawl 16 to activate switching means 26 by contact, to either close or open the electric circuit of the light emitting source. This contact would be momentary since pawl 16 is spring loaded and would return to a normal position after cleat 20 is fully seated on pedal body 10. In this way, pawl 16 mechanically becomes part of switching means 26. The latter automatic switching means 26 application is a more desirable system. This is because a built in lateral movement of cleat 20, which is common in clipless bicycle pedals to enhance comfort while cycling, will have no effect on switching means 26 whatsoever. Shutdown of the light emitting source is achieved by completely removing cleat 20. Also, if cycling illumination becomes necessary or unnecessary for some reason while cycling, cleat 20 can be partially twisted in the normal exiting manner, thus rearwardly thrusting pawl 16 enough to activate switching means 26, but not enough to cause cleat 20 to completely disengage from the bicycle pedal. Switching means 26 can also include an internal motion switch.

The entire light emitting source must be water-proofed as far as is necessary for proper functioning of all the electric components.

Referring to FIGS. 3A, 4A, 4B, 5B, 6A, 6B, and 8A thru 8D on the operation of the invention, which is incorporated into a rat-trap variety of bicycle pedal. A rat-trap variety of bicycle pedal includes a pedal tread 14 mounted onto a pedal body 10 utilizing a plurality of screws or bolts 44. Pedal tread 14 can also be integrally molded onto pedal body 10, thus creating one homogeneous unit of both pedal body 10 and pedal tread 14, (as disclosed in FIGS. 6a and 6b). Pedal body 10 is rotateably journaled on a pedal carrying shaft 12 which is adapted at one end for attachment to a bicycle.

Pedal body 10 is adapted to contain a light emitting source, which includes a light emitting diode circuit 22 and an electric power source 24 and an electric switching means 26. L.E.D. circuit 22 and power source 24 and switching means 26 are electrically connected to one another, (as disclosed in FIGS. 8a thru 8d in the various methods), structuring the light emitting source within pedal body 10. L.E.D. circuit 22 is the light emitting member of the light emitting source and includes a plurality of light emitting diodes 30 and a controllable electron valve 32 arranged on a circuit board 34. L.E.D. circuit 22 is positioned in the rear surface portion 50 of pedal body 10 behind pedal tread 14, or can be positioned in various other locations of pedal body 10, (refer to the description of FIG. 5B for further variations in the placement and composition of L.E.D. circuit 22). L.E.D. circuit 22 is protected by a transparent cover 36 which can be clear, amber, or red in color, depending on which side of the bicycle pedal is illuminated and what color L.E.D.s 30 are being utilized.

Circuit board 34 can be of any size depending on where it will be positioned in pedal body 10, with the most likely positioning in the rear surface portion 50 of pedal body 10, and can contain as few as one L.E.D. 30 and no electron valve 32 when several L.E.D. circuits 22 are distributed on pedal body 10. If one L.E.D. 30 is utilized, it must be electrically connected to a parent L.E.D. circuit 22 which contains the electron valve 32. This is because electron valve 32 controls the flashing activity of the L.E.D.s 30.

Electron valve 32 is an integrated circuit of the type designed to meter the flashing rate of L.E.D.s 30. These integrated circuits are basically linear oscillating circuits, and proper application of these circuits can be obtained in the data sheets available through the manufacturer. As will be found depending on what type of integrated circuit is being utilized, some may need the external assistance of limiting resistors and/or timing capacitors, and others need no external assistance at all. Also, depending on the design of the light emitting source, including the type of L.E.D.s 30 being utilized, electron valve 32 may be an optional element.

Power source 24 can consist of a variety of batteries from alkaline to silver and lithium, and can be of the rechargeable type. Power source 24 can consist of a single battery, or several batteries connected in series to achieve the voltage needed to operate the electron valve 32 and L.E.D.s 30, this is usually but not limited to 3 volts. Power source 24 is located in the upper surface portion 48 of pedal body 10, and is protected and concealed by a cover plate 38 which is secured by a plurality of screws 44, or an equivalent securing means such as a snap-on cover or a thread-on cover.

Switching means 26 controls the activity between L.E.D. circuit 22 and power source 24. Switching means 26 is protected by a flexible cover 28 and located in pedal body 10 in an abuse free area, which is easily and safely accessible while cycling or stationary. Switching means 26 can be positioned, but not limited to, the inside of pedal body 10, or the outer surface portion 52 of pedal body 10 behind pedal tread 14 protected from outside hazards such as street curbs, vegetation, and numerous other obstacles encountered while cycling. Switching means 26 can also include an internal motion switch.

FIGS. 6A and 6B discloses the invention which is designed for children's bicycles, wherein switching means 26 is located on the outer surface portion 52 of, and is recessed within pedal body 10, while being protected by a flexible cover 28. Switching means 26 is located on the outer surface portion 52 of pedal body 10, so as to keep children's fingers away from the drive sprocket if activation of the system becomes necessary during cycling. This positioning of switching means 26 on the outer surface portion 52 of pedal body 10, demands reaching from the outside, rather than from the inside of the foot to activate the system, thus keeping small fingers away from a big sprocket. Switching means 26 is recessed within pedal body 10 as a protection recourse for switching means 26, since children have a tendency to crash and/or abruptly abandon their bicycles during play. Switching means 26 can also include an internal motion switch.

Also, the entire light emitting source must be waterproofed as far as is necessary for proper functioning of all the electrical components.

Summary, Ramification and Scope

A consideration of the invention disclosure as a whole, will reveal that the "Light Emitting Bicycle Pedal" provides a highly visible, lightweight, and reliable way of including flashing lights oft a bicycle pedal. This is accomplished by incorporating L.E.D. (light emitting diode) technology with bicycle pedals of all types, from rat-trap to clipless. The low voltage required by the L.E.D. allows for a much smaller lighting system which is essential in today's lighter and faster bicycle market. The invention has additional advantages over the prior art in that;

(a) Failure prone mechanical parts utilized in the prior art for flashing lights are eliminated and replaced by highly reliable electrical components.

(b) The invention provides rapidly flashing lights which rotate circularly and oscillate vertically while in use, depending on the angle viewed from.

(c) The invention provides rapidly flashing lights, pedals rotating or not, a constant means of attention getting. Wherein the flashing qualities of the prior art are dependent on the rotation of the pedals, or the movement of the cycling shoe, an inconsistent means of attention getting.

(d) The light emitting diodes are highly luminescent, and can be viewed from a much further distance than conventional bulbs, which are utilized by the prior art.

(e) The invention solves the problems of the prior art by incorporating L.E.D. technology to produce highly visible and reliable flashing lights on a bicycle pedal.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. For example;

(a) The light emitting diodes can be placed on the rear, front, side corners or underside of the bicycle pedal, and any combination of those locations.

(b) The light emitting diodes can be positioned at different angles to enhance visibility while in use. Such as to wrap around the visible corners of the bicycle pedal, or angled differently relative to one another so as to enhance visibility during the pedaling rotation. The horizontal angle of a cyclists foot continually changes during the pedaling rotation.

(c) The electric power source can take various forms and locations, such as replaceable batteries or an intact rechargeable power source within the pedal structure and can be selected from any of the currently available battery types.

(d) The electric switching means can also take various forms and locations. Such as a manual switch located in an abuse free area on the bicycle pedal, an internal motion switch, or an automatic switching means, wherein the cycling shoe cleat closes and opens the L.E.D. circuit when inserted into or removed from the pedal.

(e) Due to the small size of the lighting systems components, the system can be incorporated into all types of bicycle pedals, from rat-trap to clipless.

(f) The system as a whole must be designed to permit easy access to the components involved, so as to make replacement of any component easy if necessary. Also, the lighting system must be made water-proof.

(g) The electric power source cover plate can be secured by either a plurality of screws, or can be but not limited to a snap-on type or a screw-on type of cover.

Accordingly, the scope of the invention should not be determined by the embodiments illustrated, but by the appended claims and their equivalents.

What is desired to be claimed by Letters Patent of the United States of America is as follows:

1. A light emitting bicycle pedal comprising: a one piece pedal body rotatably journaled on a pedal carrying shaft attached to a bicycle, said pedal body having an upper surface portion for supporting a foot of a cyclist and a rear surface portion comprising a portion of the pedal body which is parallel to the main axis of the pedal carrying shaft and faces toward the rear of the bicycle, said pedal body further having an outer surface portion which is perpendicular to the main axis of the pedal carrying shaft and located at the distal end of said pedal carrying shaft; said rear surface portion further housing a light emitting diode circuit comprising a plurality of light emitting diodes and a controllable electron valve connected to a circuit board, said light emitting diode circuit being attached to a first recessed cavity within said rear surface portion of said pedal body; said upper surface portion of said pedal body further having a second recessed cavity for housing an electric power source which is electrically connected to said light emitting diode circuit to supply electrical power to said light emitting diode circuit; said outer surface portion of said pedal body further having an electric switching means attached to a void on said outer surface portion of said pedal body, said electric switching means electrically connected to said light emitting diode circuit and said electric power source to control the supply of electrical power to said light emitting diode circuit, wherein said electron valve comprises an oscillating circuit such that the light emitting diodes flash when said light emitting diode circuit is energized.

2. The pedal body as in claim 1 further including a transparent cover fixedly mounted to said rear surface portion, thereby covering said light emitting diode circuit and said first recessed cavity.

3. The pedal body as in claim 1 further including a cover plate removably fastened to said upper surface portion, thereby covering and enabling access to said electric power source and said second recessed cavity.

4. The controllable electron valve as in claim 1 wherein said electron valve comprises an integrated oscillating circuit.

5. The electric switching means as in claim 1 wherein said switching means comprises a single pole single throw switch.

6. A light emitting bicycle pedal comprising: a one piece pedal body rotatably journaled on a pedal carrying shaft attached to a bicycle, said pedal body having an upper surface portion for supporting a foot of a cyclist and a rear surface portion comprising a portion of the pedal body which is parallel to the main axis of the pedal carrying shaft and faces toward the rear of the bicycle, said pedal body further having an outer surface portion which is perpendicular to the main axis of the pedal carrying shaft and located at the distal end of said pedal carrying shaft; said rear surface portion further housing a light emitting diode circuit comprising a light emitting diode and a controllable electron valve connected to a circuit board, said light emitting diode circuit being attached to a first recessed cavity within said rear surface portion of said pedal body; said upper surface portion of said pedal body further having a second recessed cavity for housing an electric power source which is electrically connected to said light emitting diode circuit to supply electrical power to said light emitting diode circuit; said outer surface portion of said pedal body further having an electric switching means attached to a void on said outer surface portion of said pedal body, said electric switching means electrically connected to said light emitting diode circuit and said electric power source to control the supply of electrical power to said light emitting diode circuit, wherein said electron valve comprises an oscillating circuit such that the light emitting diodes flash when said light emitting diode circuit is energized.

* * * * *